United States Patent [19]

Girondi

[11] Patent Number: 6,077,391
[45] Date of Patent: Jun. 20, 2000

[54] PROCESS FOR MANUFACTURING A FILTER MEDIUM

[75] Inventor: Giorgio Girondi, Monaco, Monaco

[73] Assignee: UFI Universal Filter International S.p.A., Verona, Italy

[21] Appl. No.: 08/811,726

[22] Filed: Mar. 6, 1997

[30] Foreign Application Priority Data

Mar. 6, 1996 [IT] Italy ................................. RE96A0014

[51] Int. Cl.[7] ..................................................... D21F 11/14
[52] U.S. Cl. ........................... 162/129; 162/146; 162/156
[58] Field of Search .................................... 162/123, 129, 162/130, 135, 145, 146, 156; 210/491, 504, 508, 503

[56] References Cited

U.S. PATENT DOCUMENTS

| | | | |
|---|---|---|---|
| 3,573,158 | 3/1971 | Pall et al. ................................. | 162/145 |
| 3,640,839 | 2/1972 | Ochiai ..................................... | 162/129 |
| 4,623,462 | 11/1986 | Urig et al. .............................. | 210/135 |
| 4,661,255 | 4/1987 | Aumann et al. . | |
| 5,232,595 | 8/1993 | Meyer . | |

FOREIGN PATENT DOCUMENTS

| | | |
|---|---|---|
| 0465424A1 | 1/1992 | European Pat. Off. . |
| 2758504A1 | 7/1979 | Germany . |
| 1422860 | 1/1976 | United Kingdom . |

OTHER PUBLICATIONS

Schulmeyer, "Glass Fibers in Papermaking", Paper Trade Journal, pp. 26–27, Oct. 1956.

*Primary Examiner*—Matthew O. Savage
*Attorney, Agent, or Firm*—Birch, Stewart, Kolasch & Birch, LLP

[57] ABSTRACT

A process for manufacturing a filter medium includes preparing a pH 3–5 aqueous suspension of cellulose fibers in a pulper or beater with a concentration of between 3% and 5%. A pH 2.8–3.8 aqueous suspension of glass fibers is prepared in a pulper or beater with a fiber concentration of between 0.5% and 1.2%. A first pulp consisting exclusively of cellulose fibers is prepared, to which a moisture-resistant resin is added. A second pulp is prepared consisting of cellulose fibers and glass fibers in proportions of between 30% and 70%, to which a moisture-resistant resin is added. Two superposed layers of the pulps are formed by methods used in paper manufacture. The two layers are collected on a layer of material able to absorb water. The two superposed layers of pulp are pressed to a pressure of between 0.1 and 1 kg/cm$^2$. The resultant sheet is dried to a moisture content of 1%. The dried material is impregnated with a 50 wt % solution of acrylic latex, and dried again. The dried material is then wound on a reel.

5 Claims, 3 Drawing Sheets

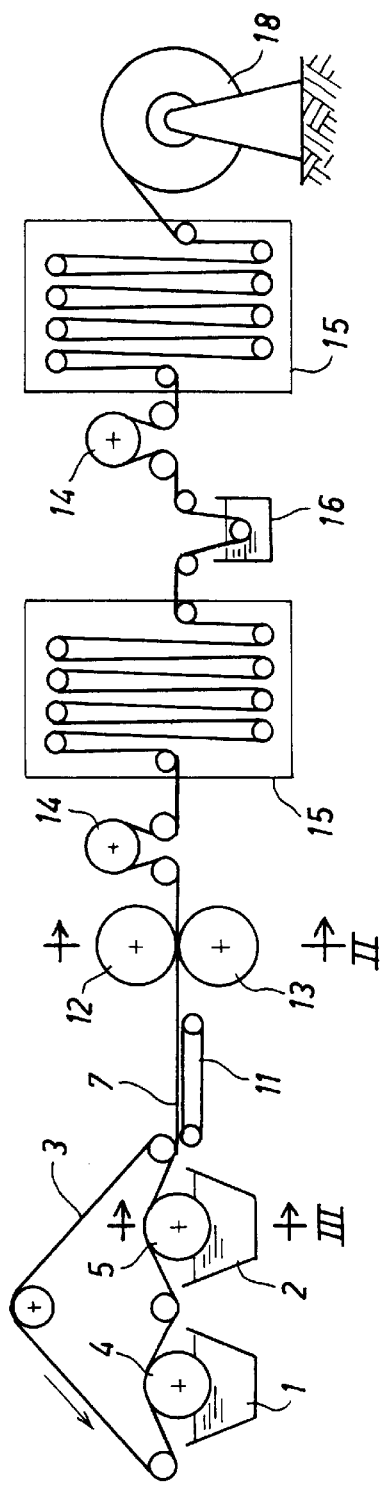
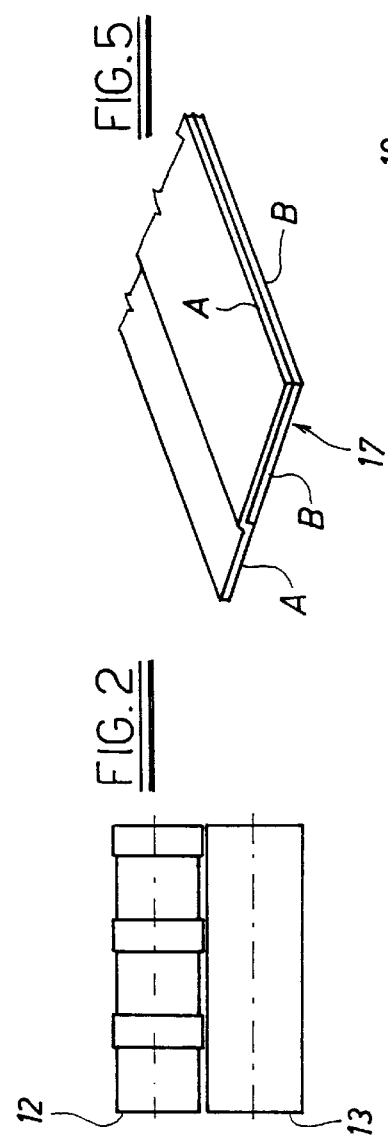
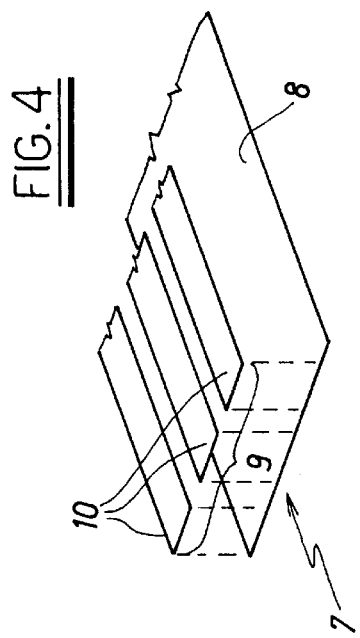

PROCESS FOR MANUFACTURING A FILTER MEDIUM

BACKGROUND OF THE INVENTION

1. Field of the Invention

This patent pertains to the technological sector of filtration in general, and relates in particular to fluid filtration in the engine field.

2. Description of the Background Art

In both Diesel cycle and Otto cycle internal combustion engines, it is well known that the lubricating oil must be kept filtered.

The problem of effective lubricating oil filtration is not easy to solve, as it involves opposing requirements.

European patent 341349 in the name of the present applicant offers a solution to the problem, consisting of locating within a filter of commonly known type, such as a full-flow filter, three filter cartridges, two of which are connected in series with each other, the combination being connected in parallel with the third.

By carefully coordinating the porosity of the three cartridges, with the parallel cartridge having a porosity between that of the two series-connected cartridges and the most porous cartridge being located externally, the filter of the said patent attains an efficiency not achievable by other full-flow filters, and achievable only by the most costly and complicated known filters such as double filtration filters.

The problem inherent in the various filtration systems will be more apparent on reading said European patent 341349, the entire contents of which is hereby incorporated by reference.

The present patent relates in particular to filters the subject of said European patent.

Although said filters have proved very effective operationally, they present certain constructional difficulties which considerably increase their cost.

In this respect they use three separate filter cartridges of different type, of both paper and unwoven fabric, which not only have to be manufactured separately and then individually mounted in the filter, but require the filter to be provided with an inner metal reinforcement to maintain them in their operating position.

SUMMARY OF THE INVENTION

The object of the present invention is to provide a filter medium from which a single filter cartridge can be formed having the characteristics of the combined three said filter cartridges of the said European patent and which can be manufactured in a single piece for insertion into the filter device as it is.

A further object of the present invention is to provide a filter medium having better filtration and mechanical characteristics than known materials.

A further object is to enable filter devices of "cup" type to be formed presenting improved filtration characteristics, within the framework of a simplified construction.

The above objects are obtained, according to the process of the present invention, by:

forming, on a web for oil filters, at least one first filtering region (A) made of a layer (A) of cellulose pulp and at least a second filtering region (AB) made of a layer (A) of cellulose pulp to which is adhered superposed at least one layer (B) of cellulose pulp and a fiber material selected from the group consisting of glass, polyester, polyethylene and polyamide fibers;

pressing the resulting web, said layers (A, B) of said at least one second filtering region (AB) being subjected to a lesser pressure than the layer (A) of said at least one first filtering region, this latter thus being positioned lying on the same plane as the layer (B) of the adjacent second filtering region (AB); and folding the pressed web in a single filter cartridge for oil filters comprising three separate filter regions, two of which are in series and the third one is in parallel with the first two.

A multilayer filter sheet, the characteristics of which will be apparent from the ensuing description of its method of manufacture, is then cut into strips and folded to form a filter cartridge of the well known toroidal form.

The technology employed in the manufacture of the filter medium is that typically used in paper manufacture.

According to the invention the process is carried out in a paper manufacturing plant for processing synthetic cellulose fibres.

At least two pulpers are provided in said plant.

One of these is used for preparing the cellulose fibre suspension in the manner known in paper manufacture.

In the present case, the cellulose fibres are provided in sheets and are processed to a concentration of between 3% and 5% at a pH of between 5 and 7.

According to the invention, the cellulose fibres have a high alpha-cellulose content to ensure sufficient inter-fibre bonds without having to use extensive beating.

In this respect, it is known that beating modifies the fibre dimensions, to create inter-fibre bonds which are so close as to compromise porosity and hence the filtering characteristics of the paper.

The other pulper is provided to disperse bales of staple glass fibre or the like in water by opening their fibres.

According to the invention, the glass fibres are processed at very low fibre concentration, of between 0.5 and 1.2%, in an acid environment of pH between 2.8 and 3.8, maintained within said range by adding sulphuric acid.

Starting from the resultant materials, two separate pulps are prepared, one containing only cellulose fibres, the other containing both cellulose fibres and glass fibres.

A proportion generally suitable for achieving good results is 50% of glass fibres and 50% of cellulose fibres, it being apparent that the glass fibre percentage influences the filtering effectiveness in a directly proportional manner, in this respect it being the glass fibres which provide the lowest porosity.

The two pulps are then purified of undesirable particles by treatment in known cleaners or cyclones, which exploit the specific gravity differences between the treated particles and the particles of dirt.

Before the formation stage a moisture-resistant resin of known type, such as an acrylic resin or an epoxy resin, is added to each pulp to increase the physical-mechanical characteristics of the fibre and make it suitable for the subsequent forming and drying stages.

The forming stage is effected in the manner well known in paper works by conveying the two pulps separately in succession onto a temporary support, substantially a plastic web, which grazes a mesh-forming cylinder dipping into a forming box containing the desired pulp.

The web firstly collects the pulp formed only of cellulose fibres, which are to form the substrate of the filter medium.

On the first layer there is then applied a second layer using the pulp containing both the cellulose fibres and the glass fibres.

This second layer can conveniently be formed as strips, by suitably masking the forming roller.

The two layers formed and combined in this manner are collected by a synthetic felt web which acts as a conveyor belt and absorbs the two pulps by capillarity, so joining them together.

According to the invention, the glass microfibres, used for the most severe filtration stage, have a size of between 0.5 and 14 microns and retain the contaminating particles while allowing the liquid undergoing filtration to pass, they also retaining particles smaller than the pore size by virtue of known phenomena such as Brownian motion.

Combining glass fibres with cellulose fibres prevents the glass fibres releasing miniparticles, commonly known as shots, which are extremely damaging if they reach the hydraulic lubrication circuits, and which up to the present time have greatly limited the use of glass fibres in filter media.

The two pulps, which are initially simply laid one on the other, are then pressed to a pressure of between 0.1 and 1 kg/cm$^2$, for example between facing rollers.

The sheet obtained in this manner is then dried, generally by a mixed method using rollers heated to about 120° C. by steam, and hot air drying ovens of adjustable temperature.

After drying, the material is impregnated with acrylic latex in a 50% solution (percentage of dry material) to give the sheet material to form the filter plate sufficient mechanical strength to resist subsequent folding of the sheet, and to withstand operating pressures of the order of between 100 and 800 kPa (kilopascals).

Further drying reducing the moisture content to the order of 1% makes it possible to wind the material onto a reel.

The filter medium of the invention enables important results to be achieved in the field of oil filters for motor vehicles.

Firstly, a single filter cartridge can be obtained comprising three separate filter regions, of which two are in series and a third is in parallel with the first two, as prescribed by the said European patent 341349.

By virtue of the invention, it is also possible to construct lubricant filters for internal combustion engines for full flow which are of simple configuration, and are provided with a single cartridge operating as a plurality of parallel cartridges of mutually different filtration characteristics.

Finally, the invention results in extraordinary simplification in the construction of known filter devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and further characteristics of the invention will be apparent from the detailed description given hereinafter with reference to the accompanying drawings, which illustrate preferred but non-limiting embodiments thereof.

FIG. 1 is a schematic side view showing part of the material processing cycle.

FIG. 2 is a section on the line II—II of FIG. 1.

FIG. 3 is a section on the line III—III of FIG. 1.

FIG. 4 is an exploded view of the material sheet when in position IV of FIG. 1.

FIG. 5 is an enlarged perspective view of a portion of the filter medium.

DETAILED DESCRIPTION OF THE PREFERRED EMBODIMENT

Figure 6:
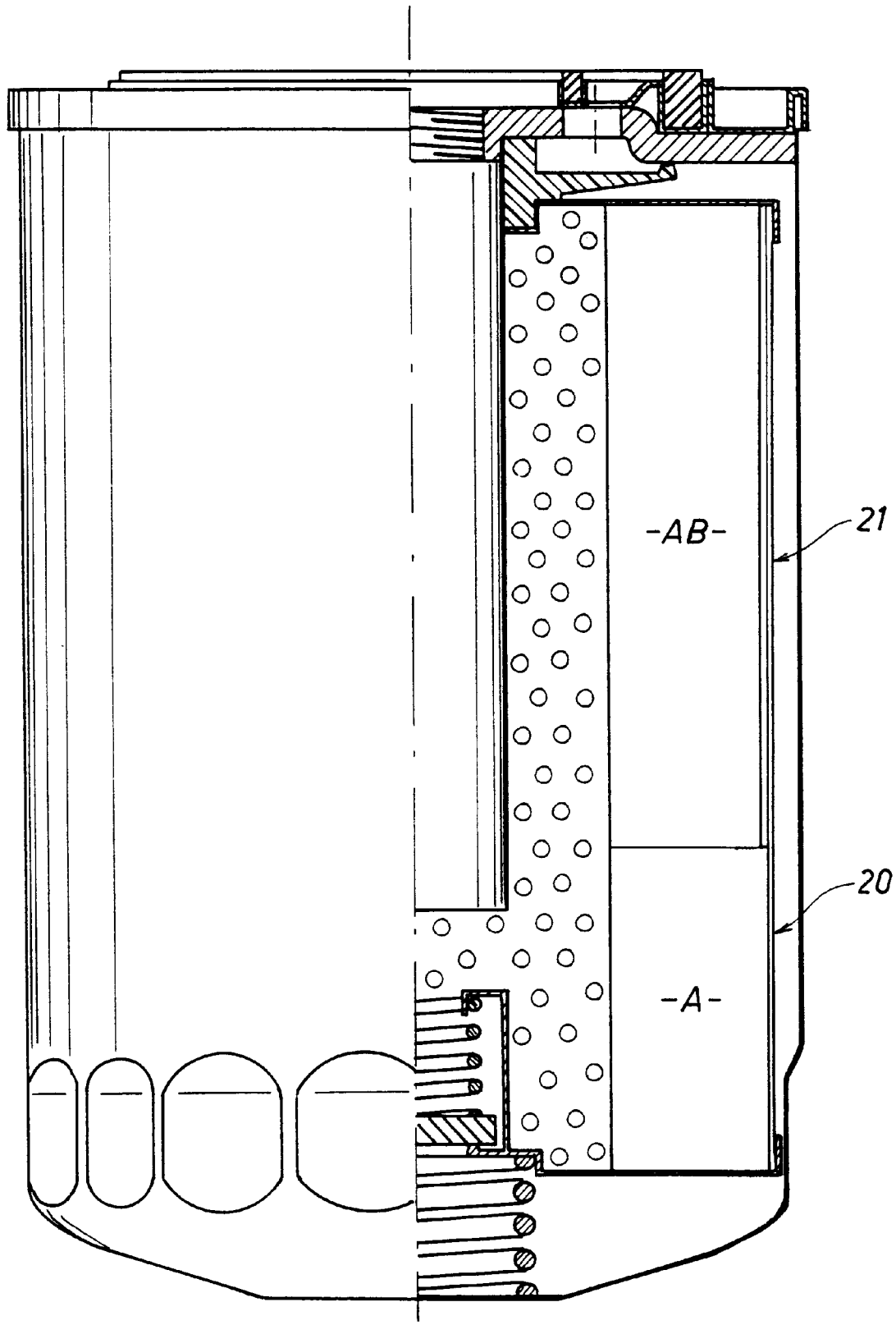
FIG. 6 shows a filter cartridge comprising the portion of FIG. 5.

The figures show two forming boxes 1 and 2, of which the box 1 contains only cellulose fibres and the box 2 contains a 50% pulp of cellulose fibres and glass fibres.

Polyester, polyethylene or polyamide fibres can be used instead of glass fibres.

A single endless support web 3 is guided along a path which successively grazes the forming rollers 4 and 5.

These latter have a mesh surface able to retain a layer of pulp which is deposited on the web 3, which also performs a first draining function.

The forming roller 5 comprises regions or strips 6 masked for example by a plastic cloth, which prevents the roller from retaining the pulp contained in the box 2.

In this manner, downstream of the box there is created a web 7 of filter medium having a first layer or substrate 8 composed of cellulose pulp, and a second layer 9 composed of strips 10 of pulp containing cellulose and glass fibres.

The web is then collected by a felt conveyor belt 11 which absorbs the pulps and fixes them together.

Downstream of the conveyor 11, the web of filter medium is pressed between two steel rollers 12 and 13, as stated.

As stated, the pressing stage can take place at a pressure of between 0.1 and 1 kg/cm$^2$, and is very delicate in that it determines the degree of compactness and hence the porosity of the two layers.

As can be seen from FIG. 2, it is implemented between two steel rollers 12 and 13, in the illustrated case one of the rollers, namely the roller 12, being of slightly differential diameter so that the regions occupied by both layers are subjected to a lesser pressure than the regions occupied by a single layer, for the reasons stated hereinafter.

FIG. 1 shows a drying roller 14 heated to about 120° C., a drying oven 15 being provided downstream.

Downstream of the drying oven, the filter medium web is immersed in an acrylic latex solution 16 after which it reaches drying means 14 and 15 identical to the preceding.

The process terminates by final winding onto a reel 18.

The web obtained in this manner is cut into strips 17 such as that shown in FIG. 5, occupied for about a third of their width by a layer A of cellulose material or paper, and for the remaining two thirds by a layer A of cellulose material and a layer B of cellulose material with glass fibres, said two layers being pressed to a lighter extent than the single layer of cellulose material because of the differing diameter of the presser roller 12.

The hence constructed sheet is folded in the usual manner (i.e., folded upon itself, or pleated) to obtain from it a single filter cartridge. As can be envisioned by a comparison of the filter cartridge of FIG. 6 and the strips 17 of FIG. 5, the strips 17 are folded across their width to form the filter cartridge to be inserted into a filter device such as that shown in FIG. 6.

During folding, care must be taken to locate the cellulose material substrate externally, so that the resultant cartridge comprises a first filtering region A of intermediate porosity in parallel with a filtering region AB which is of fine porosity internally and coarse porosity externally.

According to a further embodiment, the presser rollers 12 and 13 are perfectly cylindrical, so enabling filter cartridges to be created having regions 20 consisting only of the cellulose substrate, and characterised by coarse porosity, between regions 21 formed from two layers consisting respectively of the cellulose material alone and cellulose material with glass fibres providing finer porosity.

It is evident that by controlling the pressing by using rollers of different diameters, all desired porosity ratios can be achieved.

In the example shown in FIGS. 5 and 6, the thickness of the portion A after pressing is about 0.4 mm, while the thickness of the portion AB is about 0.8 mm.

In this latter portion, the cellulose material itself has a thickness of 0.6 mm.

Figure 7:
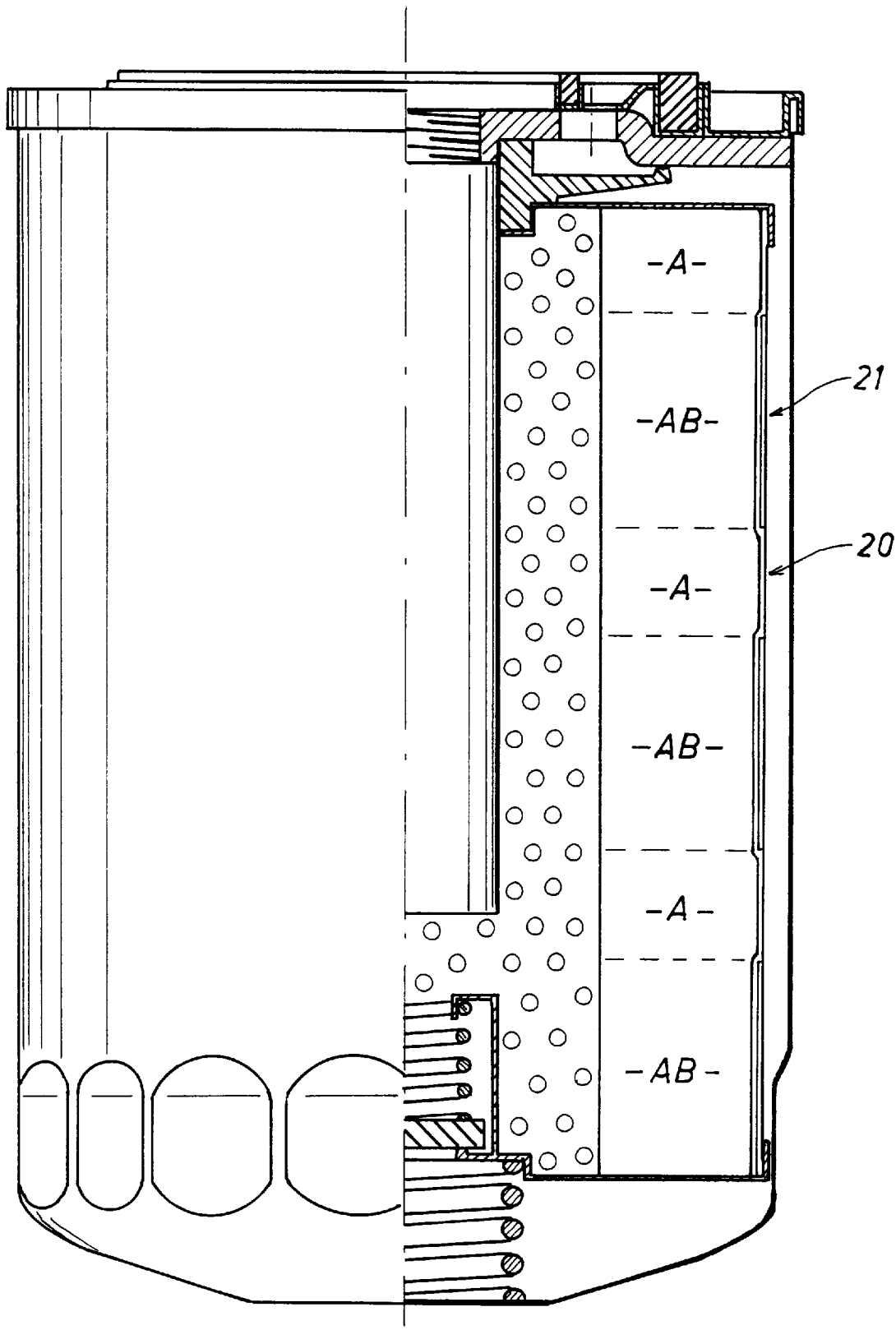
FIG. 7 shows a second embodiment of a filter cartridge comprising the invention.

In the example shown in FIG. 7, the two-layer regions and the single-layer regions have the same thickness after pressing, namely about 0.6 mm.

A further embodiment of the invention, not shown, comprises three layers, of which the outer layers are of cellulose alone, whereas the intermediate layer is of cellulose with glass fibres, or another equivalent as stated.

With reference to FIG. 6, it should be noted that the longitudinal dimensions of the filtering regions A and AB in the direction of the filter axis can be different from those shown.

For example, the filtering region A could be much longer than the filtering region AB.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A process for manufacturing a filter medium for oil filters comprising the steps of:

forming a web having at least one first filtering region made of a layer of cellulose pulp, and at least a second filtering region, said second filtering region being made of a layer of cellulose pulp to which is adhered at least one superposed layer of cellulose pulp and fiber material selected from the group consisting of glass, polyester, polyethylene and polyamide fibers, and;

pressing the web such that said layers of said at least one second filtering region are subjected to a lesser pressure than the layer of said at least one first filtering region and such that said layer of said first filtering region is positioned on a same plane as the superposed layer of cellulose pulp and fiber material of the second filtering region.

2. The process as claimed in claim 1, wherein said step of pressing the web produces said first filtering region which is of a first porosity, said superposed layer of cellulose pulp and fiber material of said second filtering region which is a second porosity that is finer than said first porosity, and said layer of cellulose pulp of said second filtering region which is a third porosity that is coarser than said first porosity.

3. The process as claimed in claim 1, further comprising the step of cutting said filter medium into strips each having a width such that each said strip is occupied for a third of said width by said first filtering region and for a remaining two thirds of said width by said second filtering region.

4. The process of claim 3, further comprising the step of folding each said strip into a tubular filter cartridge having an interior and an exterior such that the filtering region is adjacent said interior and said exterior, such that the layer of cellulose pulp of said second filtering region is adjacent said exterior, and such that said superposed layer of cellulose pulp and fiber material of said second filtering region is positioned adjacent said interior.

5. The process as claimed in claim 1, wherein said step of pressing subjects said layers of said at least one second filtering region to a pressure of between 0.1 and 1 kg/cm$^2$.

* * * * *